(12) United States Patent
Herve

(10) Patent No.: US 7,020,182 B2
(45) Date of Patent: Mar. 28, 2006

(54) APPARATUS COMPRISING A RECEIVING DEVICE WORKING WITH SPACE DIVERSITY AND PROCESSING METHOD FOR SIGNAL RECEIVED OVER VARIOUS CHANNELS

(75) Inventor: Jacob Herve, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 876 days.

(21) Appl. No.: 10/028,121

(22) Filed: Dec. 21, 2001

(65) Prior Publication Data
US 2002/0085625 A1 Jul. 4, 2002

(30) Foreign Application Priority Data
Dec. 26, 2000 (FR) .................................. 00 17045

(51) Int. Cl.
*H04K 1/00* (2006.01)
(52) U.S. Cl. ..................................................... 375/148
(58) Field of Classification Search ................ 375/130, 375/136, 137, 140, 145, 147, 149
See application file for complete search history.

(56) References Cited

U.S. PATENT DOCUMENTS

| | | | | |
|---|---|---|---|---|
| 6,252,899 B1 * | 6/2001 | Zhou et al. | .................. | 375/140 |
| 6,396,804 B1 * | 5/2002 | Odenwalder | ................ | 370/209 |
| 6,529,545 B1 * | 3/2003 | Tiirola et al. | ................ | 375/148 |
| 6,707,788 B1 * | 3/2004 | Kim et al. | .................. | 370/203 |

FOREIGN PATENT DOCUMENTS

GB 2340354 A 2/2000

* cited by examiner

*Primary Examiner*—Kenneth Vanderpuye
*Assistant Examiner*—Dung X. Nguyen
(74) *Attorney, Agent, or Firm*—Larry Liberchuk

(57) ABSTRACT

An apparatus includes two antennas and a receiving device working with space diversity. The receiving device receives signals modulated with complex time spreading coefficients produced by a base station. The receiving device includes demodulation branches which have code inputs. To avoid signals coming from the antennas being digitally coded in an independent manner, a mixer circuit shifts the phase of the signals of one of the channels, whereas the code inputs of one of the branches receive the spreading code and the inputs of at least one other branch receive the conjugate spreading code.

4 Claims, 1 Drawing Sheet

Figure 1:
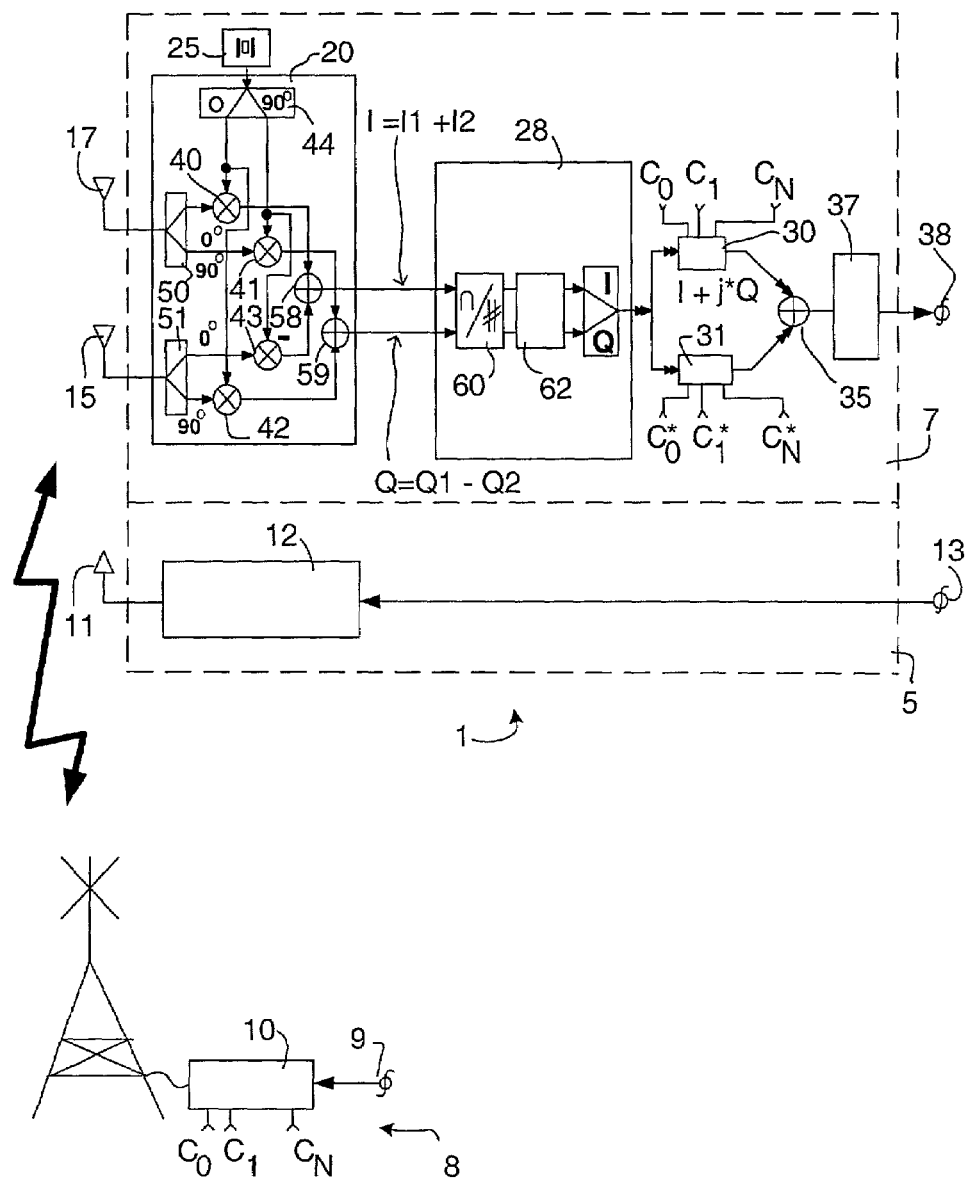

APPARATUS COMPRISING A RECEIVING DEVICE WORKING WITH SPACE DIVERSITY AND PROCESSING METHOD FOR SIGNAL RECEIVED OVER VARIOUS CHANNELS

The invention relates to an apparatus comprising a receiving device working with space diversity for signals modulated with spreading code coefficients in time and for signals received over at least two channels, the receiving device comprising a mixer circuit and a spreading code demodulation circuit in the form of demodulation branches which have code inputs.

The invention also relates to a processing method of signals received over various channels.

The invention finds applications when the spreading code modulation is used (CDMA).

In difficult propagation conditions it is found to be necessary to call for space diversity. The problem posed then is the multiplicity of the material that must be attached to each one of the channels involved in the reception of these signals. These channels are formed by receiving antennas.

Such apparatus is known from UK patent application no. 2 340 354. In this document there is proposed to process the signals coming from each of the antennas. One of the operations consists of coding these signals in digital form after a pre-processing. The multiplicity of these analog-to-digital coders which have to process fast signals is considered disadvantageous both as regards their cumbersomeness and as regards their price.

The present invention proposes an apparatus of the type mentioned in the opening paragraph which avoids the multiplicity of these coders.

For this purpose, such an apparatus is characterized in that the mixer circuit shifts the phase of the signals of one of the channels, so that the code inputs of one of the demodulation branches reconstruct the data by utilizing both conjugate and non-conjugate codes.

The inventive idea thus comprises varying the several phase shifts brought about, on the one hand, by the spreading codes and, on the other hand, by the shifting of the phase of the signals of one of the channels, so that the demodulation branches reconstruct the data by calling for both conjugate and non-conjugate codes.

The following description made with regard to the appended drawing given by way of non-limiting example will make it better understood how the invention can be realized. In the drawing:

FIG. 1 shows an apparatus in accordance with the invention.

FIG. 1 shows an apparatus 1 in accordance with the invention. This is a mobile cellular radiotelephony apparatus operating according to the CDMA modulation. It is formed by a transmitting part 5 and a receiving part 7. This apparatus is connected to a base station 8 which transmits information applied to a data access 9. According to this modulation each data is <<chopped>> by a spreading code by means of a code modulator 10. This code is a succession of N complex elements or coefficients: $C_0, C_1, \ldots C_N$. Each of these complex coefficients may adopt one of the values (1+j, 1−j, −1+j, −1−j), for example.

The transmitting part 5 of the apparatus 1 has an antenna 11 which transmits by means of a transmission device 12 information applied to an access for transmission 13.

The receiving part 7 of the apparatus 1 has a plurality of receiving antennas. Within the framework of the described example, two receiving antennas are shown which are referred to as 15 and 17, respectively. The signals captured by these antennas are processed first of all by a mixer circuit 20, which mixes them with the signal of an oscillator 25. The signals coming from this circuit are available in complex form. They are then applied to a filter coding assembly 28 to be applied to a RAKE receiver in the form of two branches 30 and 31, the signals of these two branches 30 and 31 being applied to a combining circuit 35 which is here in the form of a simple adder. A signal shaping circuit 37 adapts them so as to restore them at an access 38.

According to the invention the mixer circuit comprises four elementary mixers 40, 41, 42 and 43. The mixers 40 and 42 receive on one of their inputs the in-phase signal of the oscillator 25 via a phase shifting network 44, whereas the inputs of the mixers 41 and 43 receive via the same phase shifting network 44 the signal at 90° and −90°, respectively, of this same oscillator 25. This is denoted by the sign <<−>> placed near to the mixer 43. The other inputs of the mixers 40 and 41 receive the in-phase signals and quadrature phase signals, respectively, of the antenna 17, which is obtained via another phase shifting network 50. Similarly, the other inputs of the mixers 43 and 42 receive from the antenna 15 the in-phase and quadrature phase signals, respectively, which is realized via another phase shifting network 51. Adders 58 and 59 add up the parts called in-phase parts formed by the mixers 40 and 42 and the parts called quadrature phase parts formed by the mixers 41 and 43. At the output of the adder 58 there is an in-phase signal I which is the sum of the in-phase signals coming from the antennas 15 and 17 and at the output of the adder 59 there is a signal Q which is a difference of the quadrature signals produced by these same antennas.

Summarizing:

$I = I1 + I2$ $Q = Q1 - Q2$

I1 and Q1 being the signals from the antenna 17, and I2 and Q2 those from the antenna 15.

The signals I and Q are applied to the filter coding assembly 28 which comprises one double analog-to-digital encoder 60 (because of the complex nature of the signals which are applied thereto). The thus digitized signals are filtered by means of the filter 62 of the conventional type for this type of signals. They are thereafter applied to the two RAKE branches 30 and 31.

According to another measure of the invention the coefficients for a RAKE branch 30 are the coefficients $C_0, C_1, \ldots C_N$, whereas those of the other RAKE branch 31 are the conjugate coefficients: $C_0^*, C_1^* \ldots C_N^*$ The invention is based on the following considerations.

Each data to be transmitted is chopped into slices to be modulated with a spreading code element which is considered a complex number. Each slice is thus subjected to a rotation defined by the spreading code element.

If, on reception, a demodulation is effected by means of conjugate values of the spreading code elements, the slices are subjected to a reverse rotation to that applied on transmission, which permits to reconstruct the data.

According to the invention, thanks to the mixer circuit 20, the data received on a first channel, e.g., received by the first antenna 17, are subjected to a rotation which is the opposite to that of the spreading code element which was used to chop into slices the data that was transmitted by the base station 8. This received data was modulated with complex time spreading coefficients $C_0, C_1 \ldots C_N$ produced by the base station 8. The two demodulation branches 30, 31 of the RAKE receiver have code inputs for receiving the spreading coefficient $C_0, C_1 \ldots C_N$ and the conjugate spreading coefficients $C_0^*, C_1^* \ldots C_N^*$, respectively.

As shown in FIG. 1, when the non-conjugate code $C_0$, $C_1 \ldots C_N$ is applied to the first branch 30, the data received on a first channel are reconstructed. The data received on the second channel, e.g., received by the second antenna 15, are not consistent with the non-cojugate code and thus not demodulated or reconstructed by the first branch 30. Similarly, the data received on the second channel (e.g., via the second antenna 15) are demodulated with the conjugate code $C_0^*, C_1^* \ldots C_N^*$ in the second branch 31 of the RAKE receiver and thus reconstructed, whereas the data received on the first channel are inconsistent with the conjugate code and thus not demodulated or reconstructed in the second branch 31.

The invention claimed is:

1. An apparatus comprising a receiving device working with space diversity for signals modulated with spreading code coefficients in time and for signals received over at least two channels, the receiving device comprising a mixer circuit and a spreading code demodulation circuit in the form of demodulation branches which have code inputs, characterized in that the mixer circuit shifts the phase of the signals of one of the channels, whereas the code inputs of one of the branches receive the spreading code and the inputs of at least another branch receive the conjugate spreading code.

2. An apparatus as claimed in claim 1, characterized in that the received signals before being mixed are broken down into complex signals and in that the mixer circuit has a mixing input for reversing the imaginary part of one of the received signals.

3. An apparatus as claimed in claim 1, characterized in that a combining circuit is provided for combining the signals of the two branches.

4. A processing method for signals received over various channels, implemented in a system as claimed in claim 1 and having been subjected to a time diversity via a spreading code formed by code elements which appear in a complex form, characterized in that it comprises the following steps:

reception of signals over at least two channels, mixing of signals of each one of the channels by a local oscillator to reverse the phase of the signals of one of the channels, demodulation of the signals by means of a first demodulation branch which operates with said non-conjugate spreading code elements and at least a second demodulation branch operating with said conjugate code elements, combining signals supplied by the two branches to reconstruct the thus transmitted data.

* * * * *